Oct. 24, 1950   W. B. RETZ   2,527,079
CHIP SEAL FOR COLLETS
Filed Dec. 12, 1946
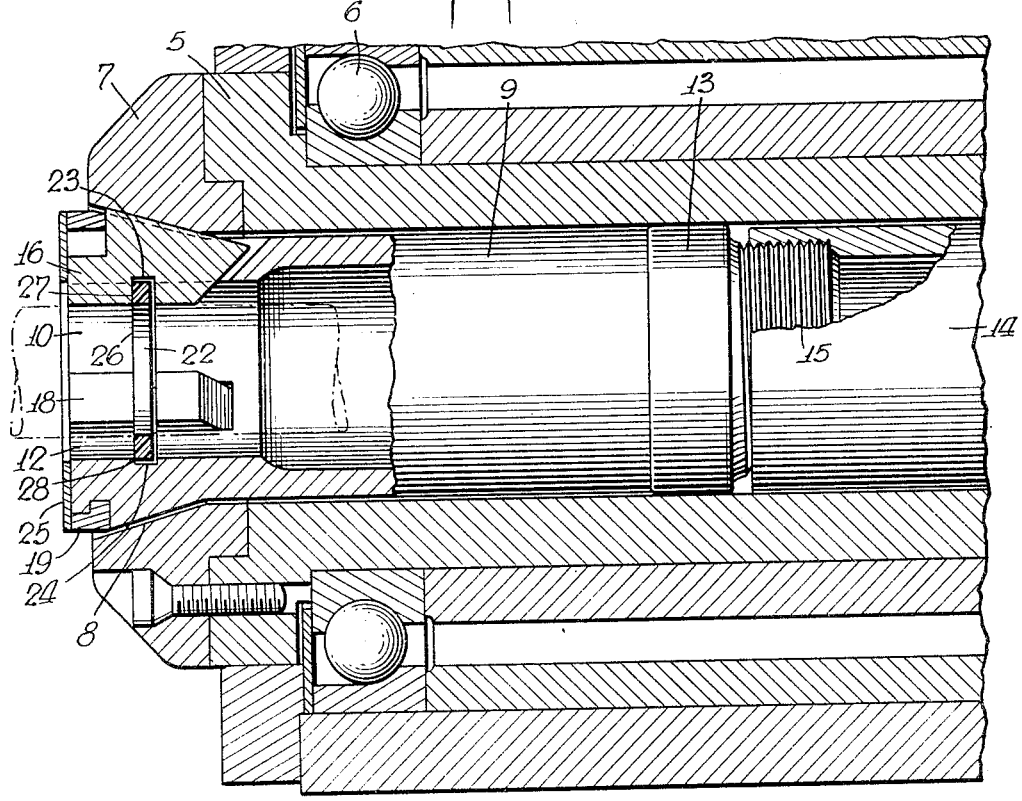
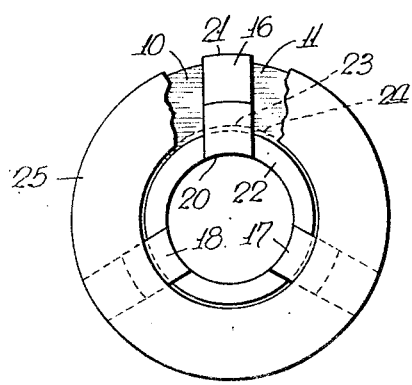
INVENTOR
William B. Retz
BY
Mitchell Buhret
ATTORNEYS.

Patented Oct. 24, 1950

2,527,079

UNITED STATES PATENT OFFICE 2,527,079

CHIP SEAL FOR COLLETS

William B. Retz, Plainville, Conn., assignor to The New Britain Machine Company, New Britain, Conn., a corporation of Connecticut Application December 12, 1946, Serial No. 715,819

7 Claims. (Cl. 279—51)

My invention relates to spindle machines and in particular to an improved sealing means for preventing the accumulation of chips and other foreign matter within the collet mechanism for such a machine.

It is an object of my invention to provide an improved chip seal for a collet.

It is another object to provide improved collet-jaw means for the accommodation of chip-seal means.

Other objects and various further features of the invention will be pointed out or will occur to those skilled in the art from a reading of the following specification in conjunction with the accompanying drawings. In said drawings:

Fig. 1 is a fragmentary sectionalized view of the spindle of a bar machine having a collet to which the chip-seal means of the invention have been applied; and Fig. 2 is a front, partially broken-away view of the collect of Fig. 1.

Broadly speaking, my invention contemplates a novel use of a ring of yieldable material as a seal for preventing chips and other foreign matter from entering a collet. In the specific form to be described, the collet mechanism comprises a plurality of radially displaceable jaws held by a collet body, and the ring of flexible material is seated in transversely extending grooves formed along the work-gripping edges of the jaws.

Referring to the drawings, my invention is shown in application to a bar machine having a spindle 5 revolubly supported by anti-friction bearing means 6. The spindle 5 includes a nose piece 7 formed with an outwardly flaring collet seat 8 for engagement with the jaw means of a collet of the drawback type. In the form shown, the collet comprises a collet body 9 having a plurality of longitudinally extending openings or slots at the nose end to define a corresponding plurality of jaw-embracing fingers 10, 11, 12. The other or back end of the collet body 9 is formed with an enlarged portion or land 13 which serves to position the collet body 9 coaxially with the spindle 5 and to guide the collet throughout its longitudinal displacement. A conventional collet tube 14 may be threadedly engaged as at 15 to the back end of the collet body 9 for conventional drawback actuation of the collet.

At the front or nose end of the machine, a plurality of jaws 16, 17, 18 are located between the fingers 10, 11, and 12. These jaws may be held in unit-handling relation with the collet body 9 by suitable retainer means including a locking ring—which may engage the front ends of the fingers 10, 11, and 12, as by a bayonet lock similar to that disclosed in the copending patent application of George O. Gridley, Serial No. 702,767, filed October 11, 1946. Each of the jaws 16, 17 and 18 is provided with a work-gripping surface 20 and a collet-seat engaging surface 21.

In accordance with the invention the collet is suitably formed to accommodate a ring 22 of flexible sealing material. In the form shown, the ring 22 is formed with an inner work-engaging surface of substantially the diameter of the stock to be held by the collet, and the outer edge or rim of the ring 22 is seated in generally circumferentially extending grooves 23—24 formed, respectively, in the work-engaging edges of the jaws and in the inner surface of the generally tubular collet holder 9. Preferably, the grooves 23—24 are cut so as to include a plane generally intermediate the longitudinal extremes of the work-gripping edges of the jaws 16, 17, 18. It will be appreciated that when the collet has been drawn back so as to cause the jaws firmly to grip the stock, the ring 22 will provide a circumferentially extending seal against entrance of chips or other foreign matter in the spaces between jaws. Also, by virtue of the fact that the seal ring 22 extends radially outwardly within the groove 24 in the collet fingers 10, 11, 12, the seal ring is more securely held and forms a more effective barrier against entrance of chips.

Preferably, as shown in Fig. 2, the jaws 16, 17, and 18 fit rather closely against the sides of the fingers 10, 11, and 12, although the radial displacement of these members is free. Of course, to permit such displacement there must be a small clearance between each jaw and its adjacent collet fingers. This space may be effectively closed to the entry of foreign matter by employment of an annular plate 25, which may be secured as by welding, screws, or other means (not shown) to the locking ring 19 at the nose. Preferably, the plate 25 extends radially inwardly to substantially the inner diameter of the collet holder 9.

To avoid possible fouling of the flexible seal ring 22 upon the work or in the grooves 23—24 during the process of stock feeding or of collet-drawback action, it is preferred that slight radial clearance be provided between the outer diameter of the ring 22 and the seating diameter for the grooves 23 in the jaws 16, 17, and 18. Also, it is preferred that there be slight longitudinal clearance of the ring 22 within the grooves 23—24. It will be appreciated, then, that the natural seating position of the ring 22, when the collet has been clamped, is for the front surfaces 26 of the ring 22 to abut tightly against the forward edges 27 in the grooves 23 and against the forward edges 28 in the grooves 24. This tight abutment along forward edges results from the natural tendency of the ring 22 to hug the stock as it is advanced and as the collet is drawn back to promote the clamping action.

It will be appreciated that I have described relatively simple means for sealing the nose of a collet against the entry of chips and other foreign matter into the collet mechanism. The particular seal shown is considered especially adaptable to collets having matched independently removable jaws, each set designed for a particular size of stock. It is to be noted that whatever the size of the jaws 16, 17, and 18 selected for use with the collet holder 9, the same locking ring 19, guard plate 25, and seal ring 22 may be employed.

While I have described my invention in detail for the preferred form shown, it will be understood that modifications may be made within the scope of the claims which follow.

I claim:

1. In a collet, a generally cylindrical collet body having a plurality of radially extending jaw-receiving openings at one end, radially displaceable jaws in said openings, each said jaw including an inner work-gripping side having a radially inwardly facing circumferential groove formed therein, and circumferentially continuous annular flexible means in each of said grooves, the inner diameter of said flexible means being substantially the same as the outer diameter of a surface to be engaged and held by said jaws.

2. In a collet, a collet body having a plurality of jaw-embracing fingers at one end, inner surfaces of said fingers being generally arcuate about the axis of said collet, jaws between said fingers and including radially inwardly projecting work-gripping surfaces, a generally transversely extending groove in each of the work-gripping surfaces of said jaws, said grooves extending radially to a depth such that when gripping stock of a given diameter the bottoms of the grooves are at a radial distance at least as great as the radius of the inner surfaces of said fingers, and a flexible ring engaging each of said grooves, said ring being formed with a substantially flat inner surface of a diameter substantially that of the stock to be accommodated by said jaws, and with an outer diameter substantially that of the inner surfaces of said fingers.

3. In a spindle machine of the character indicated, a collet seat, a collet body including radially displaceable jaw means engageable with said seat, said jaw means including a plurality of work-gripping surfaces, each of said surfaces having a generally transversely extending groove, said grooves being in substantially a common plane, and a ring of flexible material seated in said grooves, said ring having an inner diameter substantially the same as the other diameter of a surface to be gripped by said jaws.

4. As an article of manufacture, a collet jaw comprising a collet-seat-engaging surface, and a work-gripping surface, said work-gripping surface having a generally transversely extending groove for the accommodation of flexible seal means, said groove being located intermediate the longitudinal ends of said work-gripping surface.

5. As an article of manufacture, a collet jaw including a collet-seat-engaging surface, substantially parallel sides to be embraced between adjacent fingers of a collet body for supporting said jaw for radial sliding action, a work-gripping surface, and an end-thrust-receiving surface, said work-gripping surface having a generally transversely extending groove formed generally arcuately with a radius slightly in excess of that of the stock which said jaw is designed to accommodate.

6. In a collet, a generally tubular collet body having a plurality of radially extending jaw-receiving openings at one end, jaws in said openings, each of said jaws having a transversely extending seal-receiving groove in its inner edge, said body having a generally circumferentially extending seal-receiving groove in its inner surface adjacent the grooves in said jaws, and annular seal means of yieldable material seated in said grooves of said jaws and of said body, said seal means being of an inner diameter substantially the same as the outer diameter of a surface to be engaged and held by said jaws.

7. A collet according to claim 6, in which there is a radial generally annular clearance between the radially outer limiting dimension of said seal means and the bottoms of said grooves, for the purpose described.

WILLIAM B. RETZ.

REFERENCES CITED

The following references are of record in the file of this patent:

UNITED STATES PATENTS

| Number | Name | Date |
| --- | --- | --- |
| 769,896 | Gopp | Sept. 13, 1904 |
| 848,643 | Farver | Apr. 2, 1907 |
| 1,075,353 | Helms | Oct. 14, 1913 |
| 2,380,648 | Hite | July 31, 1945 |
| 2,463,292 | McCallion | Mar. 1, 1949 |

FOREIGN PATENTS

| Number | Country | Date |
| --- | --- | --- |
| 2,380,648 | Great Britain | July 31, 1945 |